United States Patent [19]

Kuwabara et al.

[11] 4,137,004

[45] Jan. 30, 1979

[54] OPERATION-CONTROL METHOD FOR HYDRAULIC MACHINE

[75] Inventors: Takao Kuwabara; Hiroshi Okumura, both of Hitachi, Japan

[73] Assignee: Hitachi, Ltd., Tokyo, Japan

[21] Appl. No.: 794,550

[22] Filed: May 6, 1977

[30] Foreign Application Priority Data

May 7, 1976 [JP] Japan .................................. 51-52519

[51] Int. Cl.² ............................................ F01D 17/26
[52] U.S. Cl. ........................................ 415/1; 415/500;
290/4 D
[58] Field of Search ................... 415/1, 500, 151, 159;
290/4 R, 4 D, 52

[56] References Cited

U.S. PATENT DOCUMENTS

| 1,494,008 | 5/1934 | Nagler | 290/4 D |
| 1,921,905 | 8/1933 | Blom | 290/4 D |
| 2,962,599 | 11/1960 | Pirkey | 415/1 |

FOREIGN PATENT DOCUMENTS 1363345 8/1974 United Kingdom ...................... 415/1

*Primary Examiner*—C. J. Husar
*Attorney, Agent, or Firm*—Thomas E. Beall, Jr.

[57] ABSTRACT

A method for controlling operations of hydraulic machines, in which two or more hydraulic machines are positioned in water conduits separated or branched upstream thereof with the branch water conduits downstream therefrom being joined together or maintained separate. Thus, these hydraulic machines are communicated with each other through the branch water conduits. In this method, the lower limit of a closing operational speed of guide vanes in one hydraulic machine is preferentially or overridingly controlled in the transient phase of operation, by detecting the closing operational speed of guide vanes of the other hydraulic machines. As a result, an abnormal condition in hydraulic pressure in upstream or downstream water conduits may be prevented, which condition would be caused in the event that the operational conditions of respective hydraulic machines are abruptly changed one after another.

10 Claims, 3 Drawing Figures

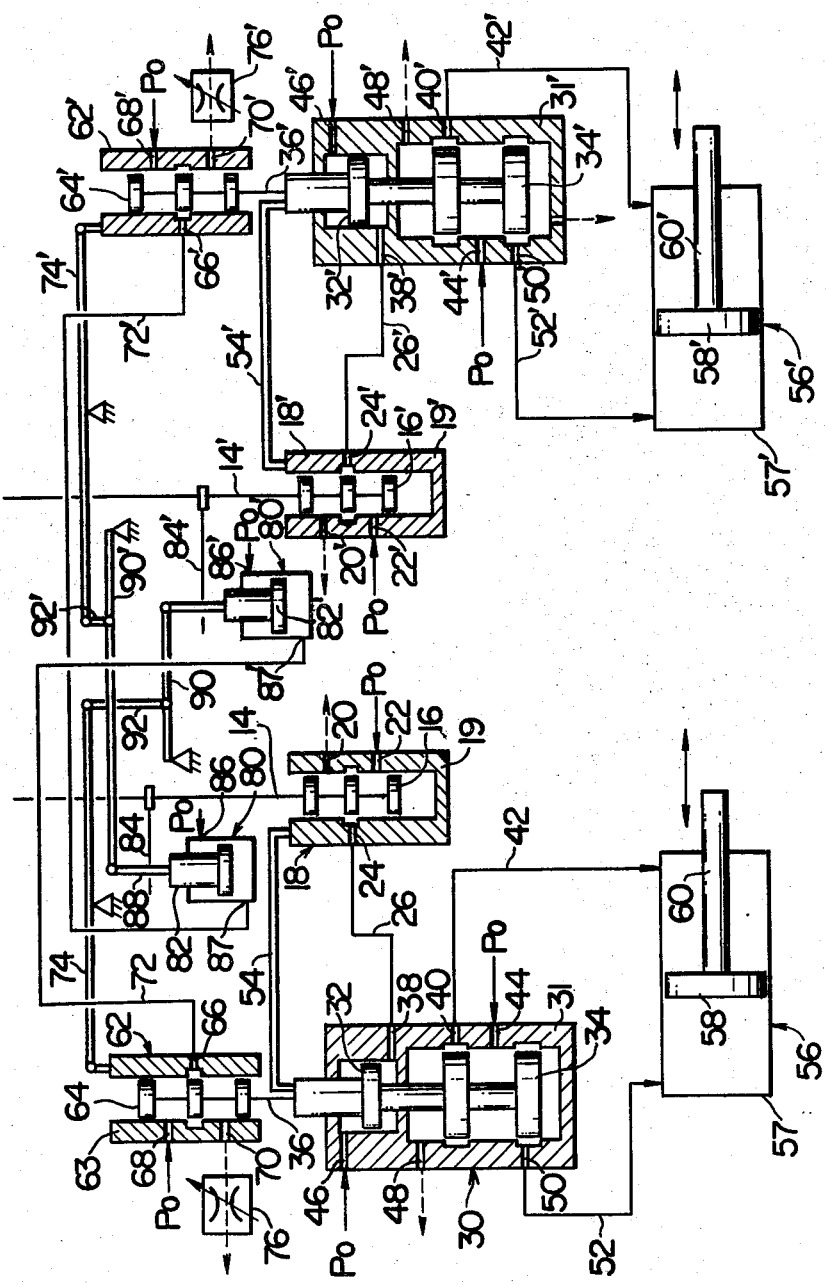

OPERATION-CONTROL METHOD FOR HYDRAULIC MACHINE

BACKGROUND OF THE INVENTION

This invention relates to two or more hydraulic machines which are connected with each other through branch water manifold which are branched upstream and/or downstream of the machines, and more particularly to an operation-control method for hydraulic machines which method controls or limits operational interaction of respective hydraulic machines and prevents an abnormal hydraulic-pressure condition in water conduits.

Recently, there have been constructed many manifold type hydraulic power plants from viewpoint of economy of civil engineering works, in which a water conduit is branched into branch water conduits with each hydraulic machine being located in each branch conduit. In a power plant of the type described, respective hydraulic machines are mutually affected in terms of hydraulic pressure through branch conduits. According to the conventional method for controlling the operations of hydraulic machines, machines are independently controlled. Accordingly, the operation control for one hydraulic machine is independent of a change in an operational condition of the other machines, so that an optimum control is not conducted for prevention of influence of the pressure of one water conduit on the other or for prevention of a resulting transient change in the operational condition of the machine. To overcome this shortcoming, it may be one of solutions to feed a change in the operation condition of one hydraulic machine to the other to control the operational condition thereof. The Japanese Laid-open Patent Publication No. TOKUKAISHO 47-16831 teaches a method for controlling guide vane openings to prevent an instable operation of one hydraulic machine, which is caused due to a change in operational condition of the other. However, there has not been proposed a method for controlling the operational speed of guide vanes, which most affects a transient hydraulic-pressure change in water conduits.

SUMMARY OF THE INVENTION

It is an object of the present invention to provide an operation - control method for preferential or overriding control of operational speeds of guide vanes in hydraulic machines by exchanging informations of operational conditions between hydraulic machines which are communicated with each other through branch conduits, thereby preventing an abnormal hydraulic pressure condition in water conduits upstream and downstream thereof.

According to the present invention, there is provided an operation control method for hydraulic machines, in which a change in operational condition of one hydraulic machine (for instance, a change in the form of a signal representing the fact that the displacement of a main distributing valve exceeds a given value) is fed to the other hydraulic machines for preferential or overriding control of the operational speed of guide vanes in the other hydraulic machines in its transient phase of operation.

BRIEF DESCRIPTION OF THE DRAWINGS

FIG. 2 is a diagram of a control system of one embodiment of the present invention, which is adopted for a power plant of FIG. 1.

DESCRIPTION OF THE PREFERRED EMBODIMENT

Figure 1:
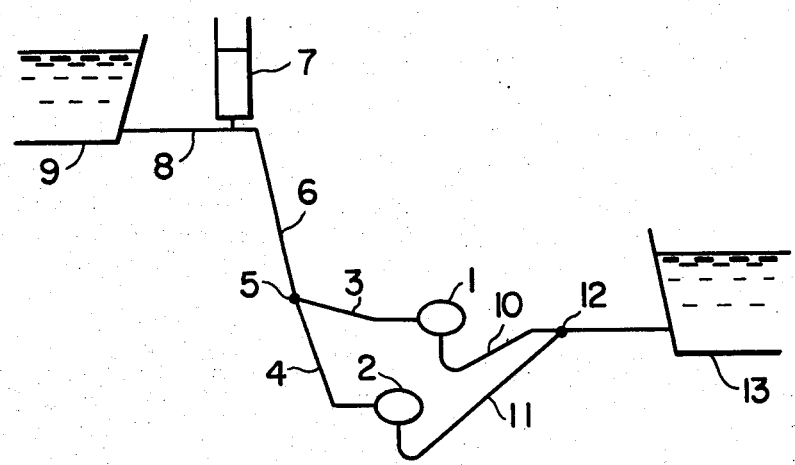
FIG. 1 is a schematic view of a water conduit system of a two-conduit type hydraulic power plant including two pump turbines or conventional turbines.

Referring to FIG. 1, pump turbines 1, 2 are connected to branch water conduits 3, 4 upstream thereof, and the branch water conduits 3, 4 are joined together at a branch point 5 and then connected via water conduit 6, a surge tank 7 and a water inlet conduit 8 to an upper reservoir 9. Furthermore, the pump turbines 1, 2 are connected downstream thereof to tailraces 10, 11, which are joined at a branch point 12 and connected to a lower reservoir 13. Alternatively, the tailraces 10, 11 may be connected to the lower reservoir 13, without being joined together.

With the pump turbines of the aforesaid arrangement, the flow rate control of water for the turbine is conducted by means of guide vanes positioned in the outer peripheral portion of a pump turbine runner.

Referring to FIG. 2, there is shown a control system for two pump turbines in a water conduit system shown in FIG. 1. The respective elements in a control device for the pump turbine 2, which are similar to those in a control device for the pump turbine 1 are designated like reference numerals with primes. Accordingly, description will be given only of a control device for the pump turbine 1 shown to the left in FIG. 2.

The control device for the pump turbine 1 includes a first portion for controlling guide-vane openings in the pump turbine 1, i.e., one hydraulic machine, a second portion for detecting guide vane openings of the aforesaid one hydraulic machine to produce a signal for use in preferential or overriding control of the guide vane openings in the other hydraulic machine, and a third portion for receiving a signal of detected guide vane openings in the other hydraulic machine for preferential or overriding control of the guide vane openings in the aforesaid one hydraulic machine.

The first portion of the control device includes: a first pilot valve bushing 18, a valve servo-motor 30, and a guide-vane servo-motor 56. The first pilot valve bushing 18 includes a cylinder 19, a plunger 16 provided within the cylinder 19, and a rod 14 integral with the plunger 16. Integrally secured to the rod 14 is an abutting plate 84, and the rod 14 is preferentially or overridingly controlled through the medium of the abutting plate 84 by the third portion of the control device. A speed control operating portion (not shown) produces a speed control signal to achieve a desired power generating condition, and feeds the signal to the other end of the rod 14 for controlling a position of the plunger 16 in the cylinder 19. The cylinder 19 is provided with an oil outlet port 20, pressure oil inlet port 22, and a port 24 positioned between the ports 20, 22. The port 24 is communicated through a pipe 26 with the valve servo-motor to be described hereinafter.

The valve servo-motor 30 includes a cylinder 31 whose interior is divided into an upper chamber and a lower chamber, a main pressure distributing plunger 34 disposed within the lower chamber in the cylinder 31, and a valve servo-motor piston 32 which is integrally connected to the main pressure distributing plunger 34. The cylinder 31 is provided with a pressure oil inlet port 46 and a port 38, which are communicated with the upper chamber, respectively, with the pipe 26 being connected to the port 38. The cylinder 31 is provided with ports 40, 50 communicated with its lower chamber, pressure oil inlet port 44, and oil outlet port 48. A rod 36 is integrally coupled through a link 54 to the cylinder 19 in the first pilot valve bushing 18, and adapted to maintain a positional relationship between the cylinder 19 in the bushing 18 and the plunger 16 constant, after a transient change in operation. In other words, the link 54 serves as a feedback mechanism for feeding a power from the valve servo-motor piston 32 back to the first pilot valve bushing 18.

The guide-vane servo-motor 56 is provided with a cylinder 57, and a servo-motor piston 58 fitted in the cylinder 57 and integral with a servo-motor piston rod 60. The servo-motor piston rod 60 pierces through an end wall of the cylinder 57 to be mechanically coupled to guide vanes (not shown) in pump turbine 1, thereby opening and closing the guide vanes. The opposite ends of the cylinder 57 are communicated via pipes 42, 52 with ports 40, 50 in the valve servo-motor 30, respectively.

The second portion in the control device includes a second pilot valve bushing 62 and a link mechanisms 74, 92, 90. The second pilot valve bushing 62 is provided with a cylinder 63, and a plunger 64 disposed in the cylinder 63, while the plunger 64 has a rod 36 for common use with the valve servo-motor piston 32 in the valve servo-motor 30. The cylinder 63 is provided with a pressure oil inlet port 68, an oil outlet port 70 and a port 66, while the oil outlet port 70 is communicated with a variable throttle 76, and the port 66 is communicated through a pipe 72 with the third portion of the control device for the pump turbine 2. The cylinder 63 is mechanically coupled through the link mechanisms 74, 92, 90 to the third portion of the control device for the pump turbine 2, thereby maintaining the consistent positional relationship of the third portion of the control device for the pump turbine 2. In other words, the link mechanisms 74, 92, 90 constitute feedback mechanisms for feeding a power from a stopper piston 82' for the pump turbine 2 back to the second pilot valve bushing 62 for the pump turbine 1.

Figure 3:
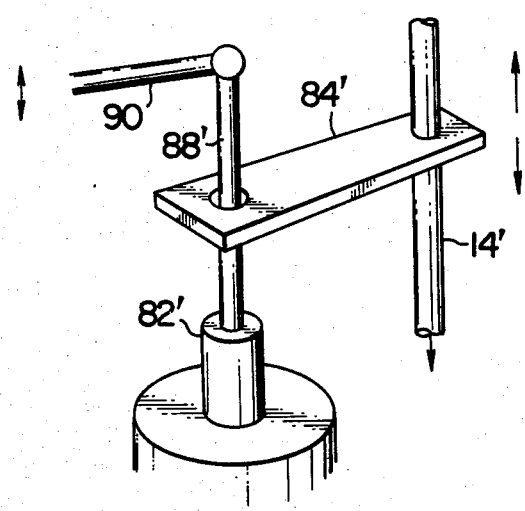
FIG. 3 is a partially enlarged view of a control system of FIG. 2.

The third portion of the control device includes a stopper cylinder 80, and a stopper piston 82 disposed within the stopper cylinder. The stopper cylinder 80 is provided with a pressure oil inlet port 86 and a port 87, while the port 87 is communicated through a pipe 72' with the second portion in the control device for the pump turbine 2. As shown in FIG. 3, the stopper piston 82 has a rod 88 which extends through a hole provided in an abutting plate 84 so as to be coupled through a link mechanism to the second portion in the control device for the pump turbine 2.

While description has been had for the control device for the pump turbine 1, it should be understood that the control device for the pump turbine 2 is of the same construction as that for the pump turbine 1. It should be further noted that the respective pressure oil inlet ports are connected to a common hydraulic pressure source.

Description will now be given of the operations of the control devices for the pump turbines 1 and 2 as shown in FIGS. 2 and 3. Assume that a load on a pump turbine is shut off. Then, a speed control signal is delivered from a speed control operating portion for the pump turbine 1, so that the rod 14 in the first pilot valve bushing 18, and hence plunger 16 is moved downwards. As a result, operating oil which is present in the upper chamber in the valve servo-motor 30 but below the valve servo-motor piston 32 is discharged through the port 38, pipe 26, and port 24 and oil outlet port 20 in the first pilot valve bushing 18. Accordingly, the valve servo-motor piston 32 is displaced downwards due to the pressure of oil fed through the pressure oil inlet port 46, whereby the plunger for the main pressure distributing valve is lowered. A port 50 in the valve servo-motor 30 is communicated with a pressure oil inlet port 44, while a port 40 is communicated with an oil outlet port 48. Thus, pressure oil is delivered through a pipe 52 to the left side of the servo-motor piston 58 in the guide vane servo-motor 56, while operating oil on the right side of the servo-motor piston 58 is discharged through a pipe 42 outside. Accordingly, the servo-motor piston 58 is displaced to the right, thereby closing the guide vanes in the pump turbine 1. Meanwhile, the plunger 64 coupled through the rod 36 to the valve servo-motor piston 32 is moved downwards, along with the valve servo-motor piston, thereby bringing the pressure oil inlet port 68 and port 66 into mutual communication, thereby delivering pressure oil through the pipe 72 to the stopper cylinder 80' for the pump turbine 2. As a result, the stopper piston 82' for the pump turbine 2 is moved upwards.

At this time, the displacement of the stopper piston 82' has been fed back to the link mechanisms 74, 92, 90, so that the positional relationship may be maintained constant. Meanwhile, the aforesaid displacement of the stopper piston 82' should be suitably determined by conditions such as water conduit condition, performance of pump turbine and the like.

In this respect, a speed control signal from a speed control operating portion for the pump turbine 2, as well, is transmitted to the rod 14' in a like manner. As shown in FIG. 3, the movement of the rod 14', i.e., the movement of the abutting plate 84' is limited by a vertical position of the stopper piston 82'. More particularly, in case a load on the pump turbine 1 is shut off, if an upward displacement of the stopper piston 82' is small, then a closing signal for the guide vanes of the pump turbine 2 is limited. On the other hand, if an upward displacement of the stopper piston 82' is larger than a given value, then a closing signal for the guide vanes in the pump turbine 2 is shut off, so that the rod 14' receives an opening signal so as to move upwards only. In this case, the plunger 16' brings the port 24' and pressure oil inlet port 22' in a shut-off condition, a partial communicating or complete communicating condition with each other in response to the displacement of the rod 14', so that the displacement of the rod 14' may be proportional to the operational speed to open and close the guide vanes in the pump turbine 2. In other words, the operational speed of guide vanes in the pump turbine 2 is preferentially or overridingly controlled due to the displacement of the stopper piston 82 in a transient phase of the operation.

The preferential or overriding control of the operational speed of guide vanes signifies as follows: for instance, when a load-shut-off signal is fed to the pump turbine 1 and the guide vanes in the pump turbine 1 are rapidly closed at a speed of 10% sec., then the guide vanes in the pump turbine 2 are so controlled as to be closed at an operational speed no higher than 2%/sec. On the other hand, when the guide vanes in the pump turbine 1 are closed at an operational speed lower than 2%/sec., then the guide vanes in the pump turbine 2 are controlled so as to be closed at an operational speed no higher than 10%/sec. Stated differently, the respective control devices impose limitations on the closing operational speeds of guide vanes in pump turbines, in a manner that when a closing operational speed of guide vanes in one pump turbine is unusually high, (for instance, the stopper piston 82' is suddenly moved upwards, and thus the abutting plate 84' is lifted), the guide vanes in another pump turbine are opened. However, the respective control devices will not control so as to positively close the guide vanes in a counterpart pump turbine.

Possible measures for directly or indirectly detecting a change in an operational condition of a counterpart hydraulic machine would be such as rotational speed N, a change in rotational speed relative to time, dN/dt, guide vane opening Y, a change in the guide vane opening relative to time, dY/dt, and a combination thereof. The feature of the present invention lies in the fact that the aforesaid signal from the counterpart or other hydraulic machine is detected, and then an extent of the operational speed of guide vanes in one hydraulic machine to be preferentially or overridingly controlled is determined in the light of water conduit condition and characteristics of hydraulic machines, so that the operational speed of the guide vanes being opened in the aforesaid one hydraulic machine may be preferentially or overridingly controlled. Many modifications and alterations may be inferred by those skilled in the art according to the aforesaid feature of the present invention.

For instance, the amount of liquid in a piping, which is dependent on the operational speed of a guide vane servo-motor in other hydraulic machine is detected, followed by a suitable computation, whereby the amount of liquid within a piping which is dependent on the operational speed of the guide vane servo-motor in one hydraulic machine is controlled in a transient phase of the operation.

According to the present invention, a mutually cooperative operation control in a branched water conduit type power plant may be effected. As a result, an abnormal hydraulic pressure condition in water conduits upstream or downstream of the hydraulic machines, which would be caused or affected by the operational condition of a counterpart hydraulic machine, may be prevented.

What is claimed is:

1. An operation-control method for hydraulic machines wherein two or more hydraulic machines are positioned in water conduits separated or branched upstream thereof, with branch water conduits downstream therefrom being joined together or maintained separate, so that said hydraulic machines are communicated with each other through said branch water conduits, said method comprising the steps of:
producing a transient operation signal correlated to a change in at least one operational condition of a hydraulic machine that will change the water conditions in the communicated water conduits; and
fixing a range of operational speed of guide vanes in another one of the hydraulic machines in response to said signal so as to override any control signal to the another hydraulic machine that would otherwise change the operational speed of its guide vanes outside of the fixed range.

2. An operation-control method for hydraulic machines, as defined in claim 1, wherein said operational condition is the rotational speed of said one hydraulic machine.

3. An operation-control method for hydraulic machines, as defined in claim 1, wherein said operational condition is the change in rotational speed relative to time of the one hydraulic machine.

4. An operation-control method for hydraulic machines, as defined in claim 1, wherein said operational condition is the guide vane opening of said one hydraulic machine.

5. An operation-control method for hydraulic machines, as defined in claim 1, wherein said operational condition is the change in the guide vane opening relative to time of said one hydraulic machine.

6. An operation-control method for hydraulic machines, as defined in claim 1, wherein said step of fixing reduces the range of operational speed of guide vane closing as the change in operational condition of the one hydraulic machine results in a reducing of the hydraulic flow through said one hydraulic machine.

7. An operation-control method for hydraulic machines, as defined in claim 6, wherein said step of fixing prevents closing of the another hydraulic machine guide vanes and opens the guide vanes of the another hydraulic machine when said transient operation signal exceeds a fixed value.

8. An operation-control method for hydraulic machines, as defined in claim 1, wherein said step of fixing decreases the permissible range of guide vane closing speed for the another hydraulic machine in direct proportion to the increase in guide vane closing speed of the one hydraulic machine, prevents closing of the guide vanes of the another hydraulic machine at a fixed value of the transient signal, and opens the guide vanes of the another hydraulic machine when the fixed value of the transient signal is exceeded.

9. An operation-control method for hydraulic machines, as defined in claim 8, wherein said step of fixing is ineffective to close the guide vanes of the another hydraulic machine.

10. An operation-control method for hydraulic machines, as defined in claim 1, wherein said step of fixing opens the guide vanes of the another hydraulic machine in response to a transient signal above a fixed level, and is ineffective to close the guide vanes of the another hydraulic machine.

* * * * *